(12) United States Patent
Krishnamurthy et al.

(10) Patent No.: US 8,819,183 B2
(45) Date of Patent: Aug. 26, 2014

(54) CONCURRENT EXECUTION OF REQUEST PROCESSING AND ANALYTICS OF REQUESTS

(75) Inventors: Rajaram B. Krishnamurthy, Wappingers Falls, NY (US); Carl J. Parris, Rhinebeck, NY (US); Charles Boice, Endicott, NY (US); Lurng-Kuo Liu, Mount Kisco, NY (US)

(73) Assignee: International Business Machines Corporation, Armonk, NY (US)

( * ) Notice: Subject to any disclaimer, the term of this patent is extended or adjusted under 35 U.S.C. 154(b) by 978 days.

(21) Appl. No.: 12/637,951

(22) Filed: Dec. 15, 2009

(65) Prior Publication Data

US 2011/0145366 A1 Jun. 16, 2011

(51) Int. Cl.
*G06F 15/16* (2006.01)
(52) U.S. Cl.
USPC ........... 709/219; 709/203; 718/100; 718/101; 705/64; 705/75; 705/77; 705/78; 705/79
(58) Field of Classification Search
USPC .................. 718/100–101; 705/64, 75, 77–79; 709/219, 203
See application file for complete search history.

(56) References Cited

U.S. PATENT DOCUMENTS

| 4,636,947 | A | * | 1/1987 | Ward ............................ 718/101 |
| 5,526,409 | A | * | 6/1996 | Conrow et al. ............ 379/91.02 |
| 5,533,204 | A | | 7/1996 | Tipley |
| 6,407,680 | B1 | | 6/2002 | Lai et al. |
| 6,647,381 | B1 | | 11/2003 | Li et al. |
| 6,704,861 | B1 | | 3/2004 | McKeen et al. |
| 6,813,251 | B1 | | 11/2004 | Garney et al. |
| 7,096,003 | B2 | * | 8/2006 | Joao et al. ..................... 455/406 |
| 7,159,233 | B2 | | 1/2007 | Son et al. |
| 7,296,263 | B1 | | 11/2007 | Jacob |
| 7,353,299 | B2 | | 4/2008 | Hattrup et al. |
| 7,478,400 | B1 | | 1/2009 | Banerjee et al. |
| 7,505,686 | B2 | | 3/2009 | Jennen |
| 7,574,405 | B2 | * | 8/2009 | Rallo et al. ..................... 705/44 |
| 7,609,652 | B2 | | 10/2009 | Kellerer et al. |
| 7,681,015 | B2 | | 3/2010 | Busck et al. |

(Continued)

FOREIGN PATENT DOCUMENTS

| CN | 1232068 C | 12/2005 |
| CN | 101308468 A | 11/2008 |

(Continued)

OTHER PUBLICATIONS

Final Office Action for U.S. Appl. No. 12/637,972 dated Aug. 31, 2011.

(Continued)

*Primary Examiner* — Duyen Doan
(74) *Attorney, Agent, or Firm* — Steven Chiu, Esq.; Blanche E. Schiller, Esq.; Heslin Rothenberg Farley & Mesiti P.C.

(57) ABSTRACT

Request processing within a computing environment is facilitated. Request processing and analytics processing for the request are performed substantially concurrently in order to improve efficiency of request execution. The analytics processing is at least commenced, and may complete, prior to receiving an indication of success or failure of the request processing. If request processing fails, analytics processing ceases, if not already complete, and results of the analytic processing are not used.

20 Claims, 6 Drawing Sheets

(56) References Cited

U.S. PATENT DOCUMENTS

| | | | |
|---|---|---|---|
| 7,743,161 | B2 | 6/2010 | Dey et al. |
| 7,797,720 | B2 | 9/2010 | Gopalakrishnan et al. |
| 8,108,234 | B2* | 1/2012 | Suenbuel et al. ............ 705/7.11 |
| 8,170,928 | B2* | 5/2012 | Knowles et al. ................. 705/28 |
| 8,209,375 | B2 | 6/2012 | Gormish et al. |
| 2002/0138376 | A1* | 9/2002 | Hinkle ............................. 705/30 |
| 2003/0191805 | A1 | 10/2003 | Seymour et al. |
| 2003/0195940 | A1 | 10/2003 | Basu et al. |
| 2004/0039691 | A1* | 2/2004 | Barratt et al. .................... 705/39 |
| 2004/0205199 | A1 | 10/2004 | Gormish |
| 2004/0243643 | A1 | 12/2004 | Hattrup et al. |
| 2005/0021806 | A1 | 1/2005 | Richardson et al. |
| 2005/0209957 | A1* | 9/2005 | Kasiviswanathan et al. ... 705/39 |
| 2006/0090009 | A1 | 4/2006 | Gopalakrishnan et al. |
| 2006/0123467 | A1 | 6/2006 | Kumar et al. |
| 2006/0259627 | A1 | 11/2006 | Kellerer et al. |
| 2006/0294239 | A1 | 12/2006 | Ishida |
| 2007/0180496 | A1* | 8/2007 | Fransdonk ........................ 726/3 |
| 2008/0082647 | A1 | 4/2008 | Baker |
| 2008/0086570 | A1 | 4/2008 | Dey et al. |
| 2008/0133741 | A1 | 6/2008 | Kubota |
| 2008/0162881 | A1 | 7/2008 | Welc et al. |
| 2008/0184011 | A1 | 7/2008 | Busck et al. |
| 2009/0028142 | A1 | 1/2009 | Schmidt et al. |
| 2009/0055473 | A1 | 2/2009 | Synnergren |
| 2009/0217266 | A1 | 8/2009 | Krishnamurthy et al. |
| 2009/0262749 | A1 | 10/2009 | Graumann et al. |
| 2009/0271262 | A1* | 10/2009 | Hammad ......................... 705/14 |
| 2010/0281142 | A1 | 11/2010 | Stoyanov et al. |
| 2011/0126275 | A1 | 5/2011 | Anderson et al. |
| 2011/0137795 | A1* | 6/2011 | Nambiar et al. ................. 705/43 |
| 2011/0145318 | A1 | 6/2011 | Krishnamurthy et al. |
| 2011/0145366 | A1 | 6/2011 | Krishnamurthy et al. |
| 2011/0145429 | A1 | 6/2011 | Krishnamurthy et al. |
| 2012/0278384 | A1 | 11/2012 | Synnergren et al. |

FOREIGN PATENT DOCUMENTS

| | | |
|---|---|---|
| JP | 2000353066 A | 12/2000 |
| JP | 2005505214 A | 2/2005 |
| JP | 2006146951 A | 6/2006 |
| JP | 2008197783 A | 8/2008 |
| WO | 2008092883 A3 | 8/2008 |

OTHER PUBLICATIONS

Office Action for U.S. Appl. No. 12/637,962 dated Sep. 6, 2011.

International Search Report and Written Opinion for PCT/EP2010/068205 dated Mar. 18, 2011.

Redlich, J.P. et al., "Virtual Networks in the Internet," Open Architectures and Network Programming Proceedings, Mar. 1999, pp. 108-114.

Office Action for U.S. Appl. No. 12/637,972 dated May 12, 2011.

Z/Architecture Principles of Operation, IBM Publication No. SA22-7832-07, Feb. 2009.

Reddy, P. and Kitsuregawa M., "Speculative Transaction Processing Approach for Database Systems," IEIC Technical Report, vol. 98, No. 487, pp. 11-18. (Abstract Only).

Final Office Action for U.S. Appl. No. 12/637,962 dated Apr. 30, 2012.

Office Action for U.S. Appl. No. 12/637,972 dated Nov. 13, 2013, pp. 1-19.

Final Office Action for U.S. Appl. No. 12/637,972 dated Aug. 31, 2011, pp. 1-10.

International Search Report and Written Opinion for PCT/EP2010/068205 dated Mar. 18, 2011, pp. 1-11.

"z/Architecture Principles of Operation," IBM Publication No. SA22-7832-07, Feb. 2009, pp. 1-1344.

Reddy, P. and Kitsuregawa M., "Speculative Transaction Processing Approach for Database Systems," IEIC Technical Report, vol. 98, No. 487, pp. 11-18, 1998 (Abstract Only).

Office Action for U.S. Appl. No. 12/637,972 dated May 12, 2011, pp. 1-12.

* cited by examiner

CONCURRENT EXECUTION OF REQUEST PROCESSING AND ANALYTICS OF REQUESTS

BACKGROUND

This invention relates, in general, to facilitating processing within a computing environment, and in particular, to facilitating processing of requests, such as transactions, within the computing environment.

Currently, when a transaction is received at a server, the transaction is validated and/or authorized prior to performing any other processing for the transaction. If the validation or authorization process fails, then the transaction ends without performing any other processing for the transaction. However, if the authorization and/or validation succeeds, then analytic processing for the transaction is performed. This includes, for instance, performing mathematical computations or analysis on the transaction data.

In certain environments, the authorization/validation is performed by one process and the analytics are performed by another process in the same system. Thus, when, and only when, the authorization/validation succeeds, the data is extracted from the transaction and forwarded from the one process to the another process to perform the analytics. Subsequent to performing the analytics, the results are then provided to the one process that performed the authorization/validation. The system then provides a message to the requestor of the transaction.

BRIEF SUMMARY

In accordance with an aspect of the present invention, request processing (e.g., authorization and/or validation) for a request (e.g., a transaction) and analytic processing for that request are performed concurrently. That is, the analytic processing for the request begins prior to an indication of success or failure of the request processing.

The shortcomings of the prior art are overcome and additional advantages are provided through the provision of a computer program product for facilitating request processing within a computing environment. The computer program product includes a storage medium readable by a processing circuit and storing instructions for execution by the processing circuit for performing a method. The method includes, for instance, obtaining, by at least one computing unit of the computing environment, data of a request to be executed; and at least initiating, by the at least one computing unit, analytics processing on the data of the request prior to an indication of success or failure of request processing for the request, wherein at least a portion of the request processing is to be performed substantially concurrently to at least a portion of analytics processing.

Methods and systems relating to one or more aspects of the present invention are also described and claimed herein. Further, services relating to one or more aspects of the present invention are also described and may be claimed herein.

Additional features and advantages are realized through the techniques of the present invention. Other embodiments and aspects of the invention are described in detail herein and are considered a part of the claimed invention.

BRIEF DESCRIPTION OF THE SEVERAL VIEWS OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION

In accordance with an aspect of the present invention, analytics processing for a request is initiated prior to an indication of success or failure of request processing for the request. Request processing is processing that, if successful, authorizes and/or validates a request. It includes, for instance, authorization processing, such as confirming account numbers and checking for sufficient funds in an ATM request, as examples; and/or execution operations that if successful validate a request, such as debiting an account and simultaneously crediting another account, as an example. Request processing may include the authorization processing, validation processing (e.g., execution operations) or both. For instance, in the above example, the accounts to be debited and credited may first be authorized, and then the debit and credit operations are performed. As a further example, pre-authorization is already performed or no authorization is needed, and therefore, only execution operations are performed. Yet further, only authorization is performed and not execution operations. Other examples are also possible.

Request processing is successful, if the authorization and/or validation processing (dependent on which processes are performed) succeed. Conversely, the request processing is a failure, if at least one of the authorization or validation processing (again, dependent on which are performed) fails. A request is unauthorized, if authorization processing for that request fails or has yet to be performed, assuming that its processing is planned; and invalid, if validation processing (e.g., execution operations) fails or has yet to be performed, assuming that its processing is planned.

Conventionally, request processing occurred before analytics processing could begin (i.e., pre-analytics processing). It controlled whether analytics processing would be performed. If response processing succeeded, then analytics processing was performed; otherwise, it was not performed. However, in accordance with an aspect of the present invention, analytics processing may be commenced before or concurrent to request processing. It is performed prior to a determination of success or failure of the request processing to provide higher performance and efficiency. Such speculative analytics processing is especially cost-effective when it can be executed on a separate commodity analytics cluster without additionally burdening the server (already processing authorization/validation operations of the request).

Request processing for a request and analytics processing for the same request are parallelized using a speculative protocol. This allows the analytics to commence for an unauthorized or invalid request (i.e., request processing in which success or failure has yet to be indicated) without committing any state. The request processing and analytics processing can be executed on a hybrid system, in which each system has complete capabilities and the systems are closely integrated. There are many types of requests which can be processed in accordance with an aspect of the present invention. In the examples described herein, the request is a transaction. An example of a transaction is a debit from one account and a credit into several accounts, where the debit and credit are to be processed in unison. However, this is only one example of a transaction, and transaction is only one example of a request.

Figure 1:
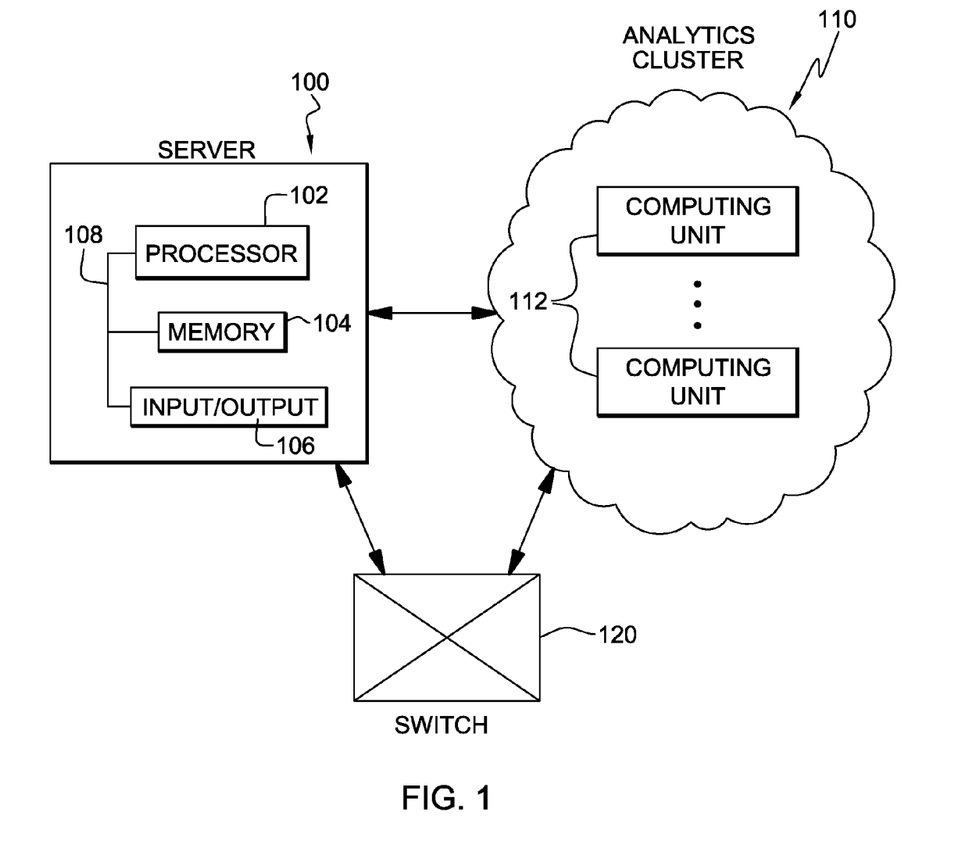
FIG. 1 depicts one example of a computing environment to incorporate and use one or more aspects of the present invention.

One embodiment of a computing environment to incorporate and use one or more aspects of the present invention is depicted in FIG. 1. In this example, a server 100 is coupled to an analytics cluster 110. Server 100 includes, for instance, one or more processors 102, memory 104, and one or more input/output (I/O) devices or interfaces 106 coupled to one another via one or more buses 108. As examples, server 100 is a System p®, System x® or System z® server offered by International Business Machines Corporation (IBM®), Armonk, N.Y. IBM®, System p®, System x® and System z® are registered trademarks of International Business Machines Corporation, Armonk, N.Y. Other names used herein may be registered trademarks, trademarks or product names of International Business Machines Corporation or other companies.

In another embodiment, the server includes one or more partitions or zones. For example, the server is a logically partitioned System z® server based on the z/Architecture® offered by International Business Machines Corporation, Armonk, N.Y. The z/Architecture® is described in an IBM® publication entitled, "z/Architecture Principles of Operation," IBM Publication No. SA22-7832-07, February 2009, which is hereby incorporated herein by reference in its entirety. z/Architecture® is a registered trademark of International Business Machines Corporation, Armonk, N.Y.

In one example, analytics cluster 110 includes one or more computing units 112. In one example, the computing units are hardware accelerators, such as blades in a blade center or chassis. Example accelerators include IBM® Cell BE blades; IBM® Datapower units; nVidia GPUs; and/or System p® or System x® blades, offered by International Business Machines Corporation. In a further example, the computing units are servers, such as System x®, System p® or System z® servers. Many other examples are also possible. The cluster may include a mix of different computing units.

In one example, server 100 communicates with analytics cluster 110 via, for instance, a network, such as PCI Express, InfiniBand, Ethernet, etc. Further, server 100 and analytics cluster 110 are coupled to at least one switch (or other steering unit) 120 via, for instance, Infiniband or an Ethernet network. Switch 120 is, for instance, a server, such as a System x®, System p®, or System z® server, or a switch device offered by Cisco Systems, Inc. or International Business Machines Corporation, as examples. The switch receives requests from requestors and forwards those requests to the server and analytics cluster, as described herein.

Figure 2:
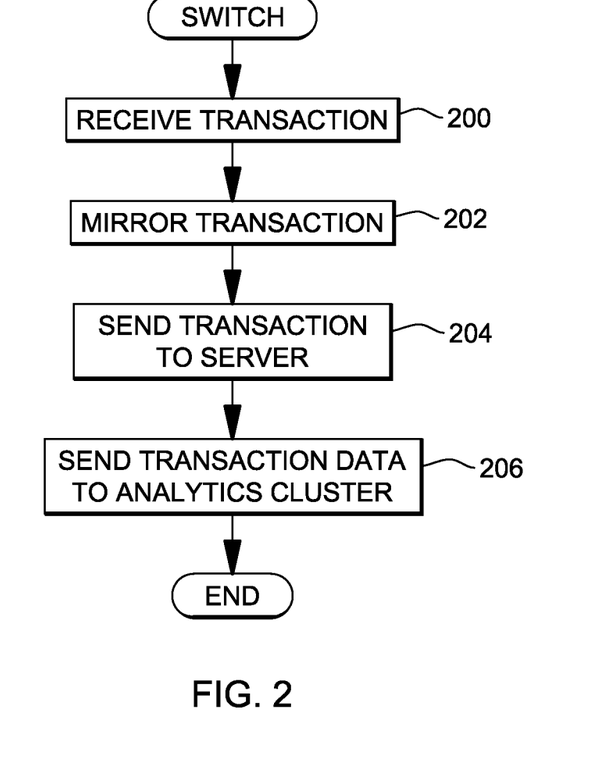
FIG. 2 depicts one embodiment of the logic performed by a switch in receipt of a request, in accordance with an aspect of the present invention.

One embodiment of the logic to receive requests by a switch and forward them is described in detail with reference to FIG. 2. Initially, the switch receives a transaction (e.g., at an input port of the switch) from a requestor, STEP 200. The requestor is a person, such as a person at a point-of-sale (POS) terminal or other person; or a machine, as examples.

In response to receiving the transaction, the switch mirrors the transaction, STEP 202. For instance, it makes a copy of the transaction or at least relevant portions of the transaction. It then sends the received transaction to the server identified in the destination address of the transaction This enables the server to execute the transaction, including performing request processing, STEP 204. Further, it revises the destination address in the copy of the transaction to indicate a computing unit of the analytics cluster (it may supply multiple addresses for multiple computing units), and sends the revised transaction to the designated computing unit, STEP 206. As examples, the switch can use port mirroring logic on the switch to forward the transaction to the analytics cluster, or it can use a protocol tunnel, in which I/O hardware logic on the server tunnels packets to the computing units without the main CPU being engaged. The revised transaction copy may include only the information needed by the analytics cluster, such as the input data of the transaction.

In response to receiving the transaction at the server, the server initiates request processing for the transaction. As one particular example described herein, the request processing includes authorization processing; however, in other examples, the request processing may include authorization processing and/or other types of processing (e.g., validation processing via execution operations) that provide an indication of success/failure on which analytics processing will ultimately depend (e.g., indicates whether analytics processing continues and/or whether its results will be used). In this example, the analytics processing commences prior to receiving an indication that the transaction is authorized. Again, this is only one example.

Similarly, in response to receiving the transaction at the analytics cluster, one or more of the computing units begin analytics processing (e.g., complex computations, computation or analysis over time, etc.) for that transaction without knowing whether the request processing successfully completed. One embodiment of the logic performed by the server is described with reference to FIGS. 3A-3B; and one embodiment of the logic performed by the analytics cluster is described with reference to FIG. 4.

Figure 3A:
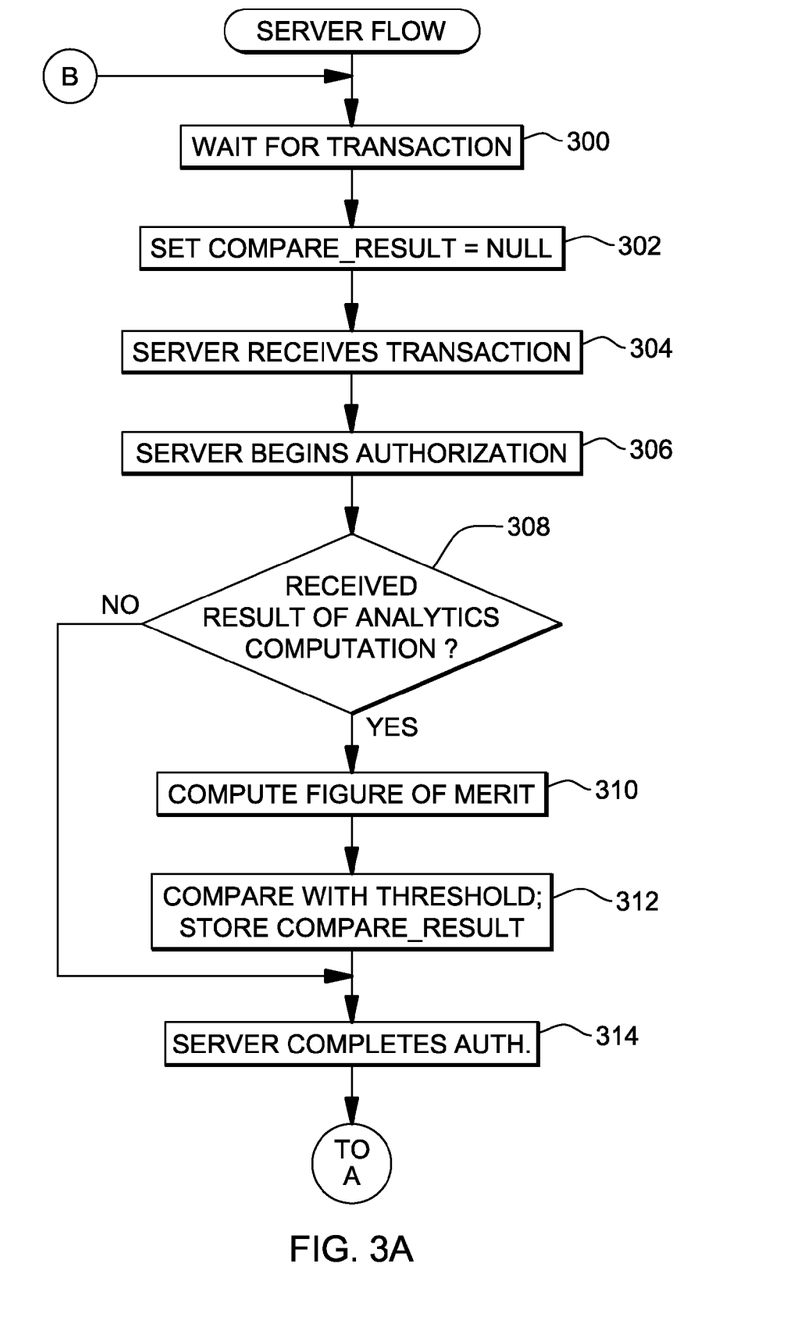
FIGS. 3A-3B depict one embodiment of the logic performed by a server executing a request, in accordance with an aspect of the present invention.

Referring initially to FIG. 3A, the server waits for a transaction, STEP 300. As part of initialization, the server sets a variable, compare_result, to null, STEP 302. At some point in time, the server receives a transaction, STEP 304, and it begins its authorization process, STEP 306. The steps for authorization can vary per transaction, but in one example of a credit card transaction, it would include verifying that the credit limit has not been exceeded.

A determination is made as to whether the server has received results of the analytic processing associated with this transaction, INQUIRY 308. If it has received the results, then a figure of merit is computed, STEP 310. In one example, this includes taking a set of inputs and deriving a numerical value that may be used in a comparison. As one particular example, assume the analytics processing is used to determine whether a credit card is fraudulent. A set of computations is performed by the analytics cluster and each computation yields a numerical value. Those values are returned to the server, which performs a mathematical computation (e.g., sum, weighted average, regression, etc.) to obtain a result, which is the figure of merit.

The result of the figure of merit is then compared with a threshold. The threshold is system or designer defined, as examples, and can change during operation of the workload. If the compare is less than or equal to the threshold, then compare_result is set equal to in_range; however, if the compare is greater than the threshold, then compare_result is equal to out_of_range, in this particular example, STEP 312. Many other examples are possible.

Figure 3B:
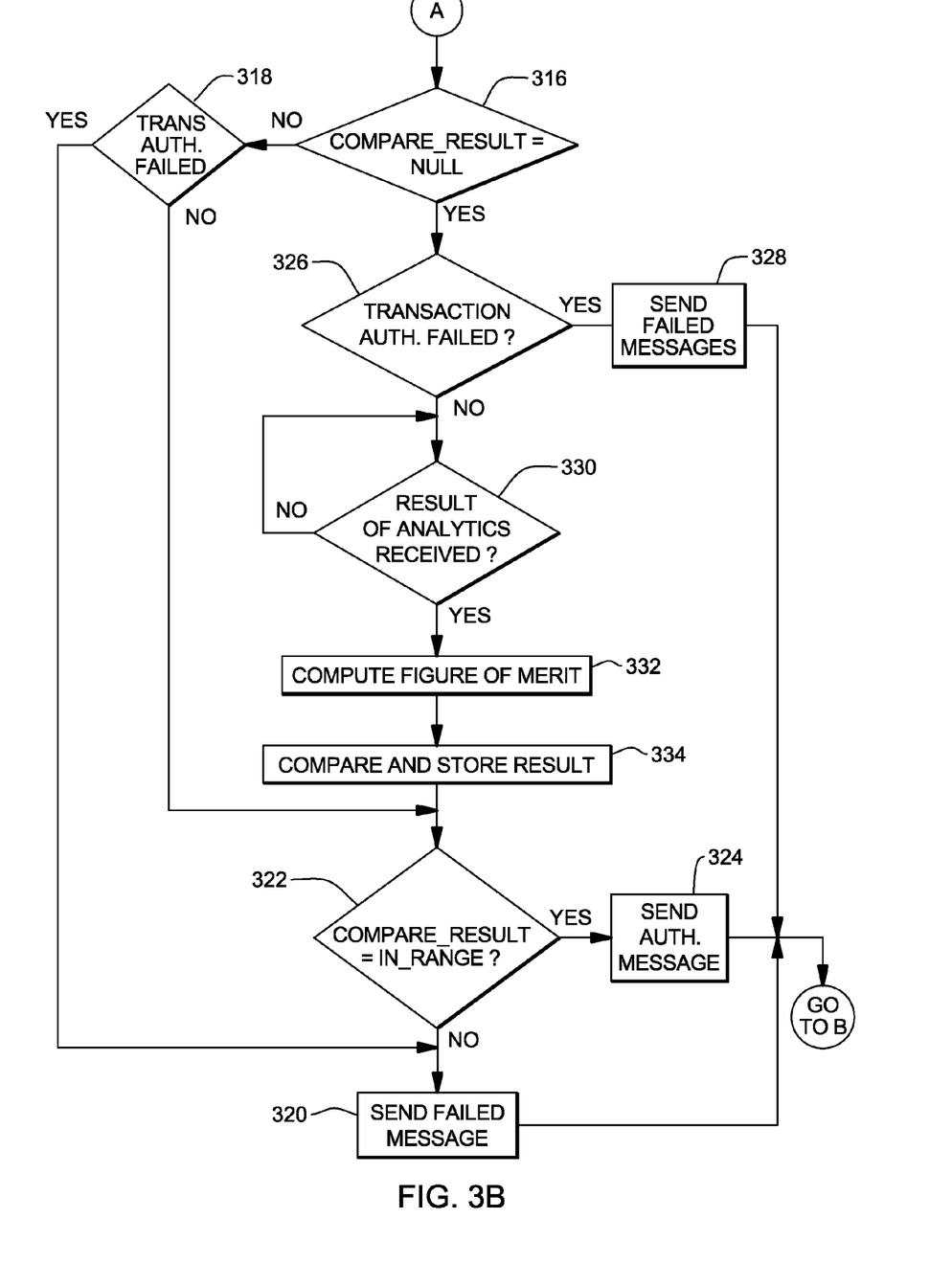

Thereafter, or if the server has not received results of the analytic processing, the server completes authorization (or other request processing in other examples), STEP 314. Processing then continues with determining whether compare_result is equal to null, INQUIRY 316 (FIG. 3B). If compare_result is not equal to null indicating that the analytics processing has already completed, then a further determination is made as to whether the transaction authorization failed, INQUIRY 318. If transaction authorization failed, then a failed message is sent back to the requestor (e.g., customer) even if the analytics had completed, STEP 320. Processing then continues with STEP 300 (FIG. 3A), in which the server waits for another transaction.

Returning to INQUIRY 318 (FIG. 3B), if the transaction authorization was successful, then a determination is made as to whether compare_result is equal to in_range, INQUIRY 322. If compare_result is out_of_range, then even though authorization was successful, a failed message is sent back to the requestor, STEP 320, and processing continues with STEP 300 (FIG. 3A).

Returning to INQUIRY 322 (FIG. 3B), if compare_result equals in_range, then an authorized message is sent back to the requestor, STEP 324. This indicates that both the authorization and the analytics were successful. Processing then continues with STEP 300 (FIG. 3A), in which the server waits for another transaction.

Returning to INQUIRY 316 (FIG. 3B), if the compare_result is null indicating that the analytics cluster has not completed analytics processing, then a determination is made as to whether the transaction authorization failed, INQUIRY 326. If it has failed, then a failed message is sent to the analytics cluster so that the cluster can cancel analytics processing, STEP 328. Additionally, a failed message is sent back to the requestor and processing continues with STEP 300 (FIG. 3A).

However, if transaction authorization has succeeded, INQUIRY 326 (FIG. 3B), then a determination is made as to whether a result of the analytics processing has been received yet, INQUIRY 330. If not, then processing continues with waiting for the analytics processing to complete. However, when results of analytics processing have been received, then a figure of merit is computed, STEP 332, and the result of that computation is compared to a threshold. The result is stored in compare_result, STEP 334.

A determination is then made as to whether compare_result is equal to in_range, INQUIRY 322. If so, then an authorized message is sent, STEP 324, since both authorization and the analytics processing were successful. However, if compare_result is equal to out_of_range, then a failed message is sent, STEP 320. This completes processing of the server logic.

Concurrent to the server processing, the analytics cluster is processing analytics of the transaction being processed (e.g., authorized). One example of this processing is described with reference to FIG. 4. Initially, one or more computing units of the analytics cluster wait for a computation or analysis request embedded in the transaction to be received, STEP 400. In response to receiving the transaction, computation inputs are extracted from the transaction, STEP 402, and computation and/or analysis is started, STEP 404. This processing depends on the specific request. It may include, for instance, determining if an ATM transaction is fraudulent, in which a set of computations is performed, a value is set for each computation, and those values are used to determine the figure of merit reflecting the possibility of fraud; it may include computing a specific calculation, like number of total credits to bank savings accounts from an ATM terminal; or determining the total number of monthly transactions from a specific ATM in relation to other ATMs, as examples. Many other possibilities exist.

Figure 4:
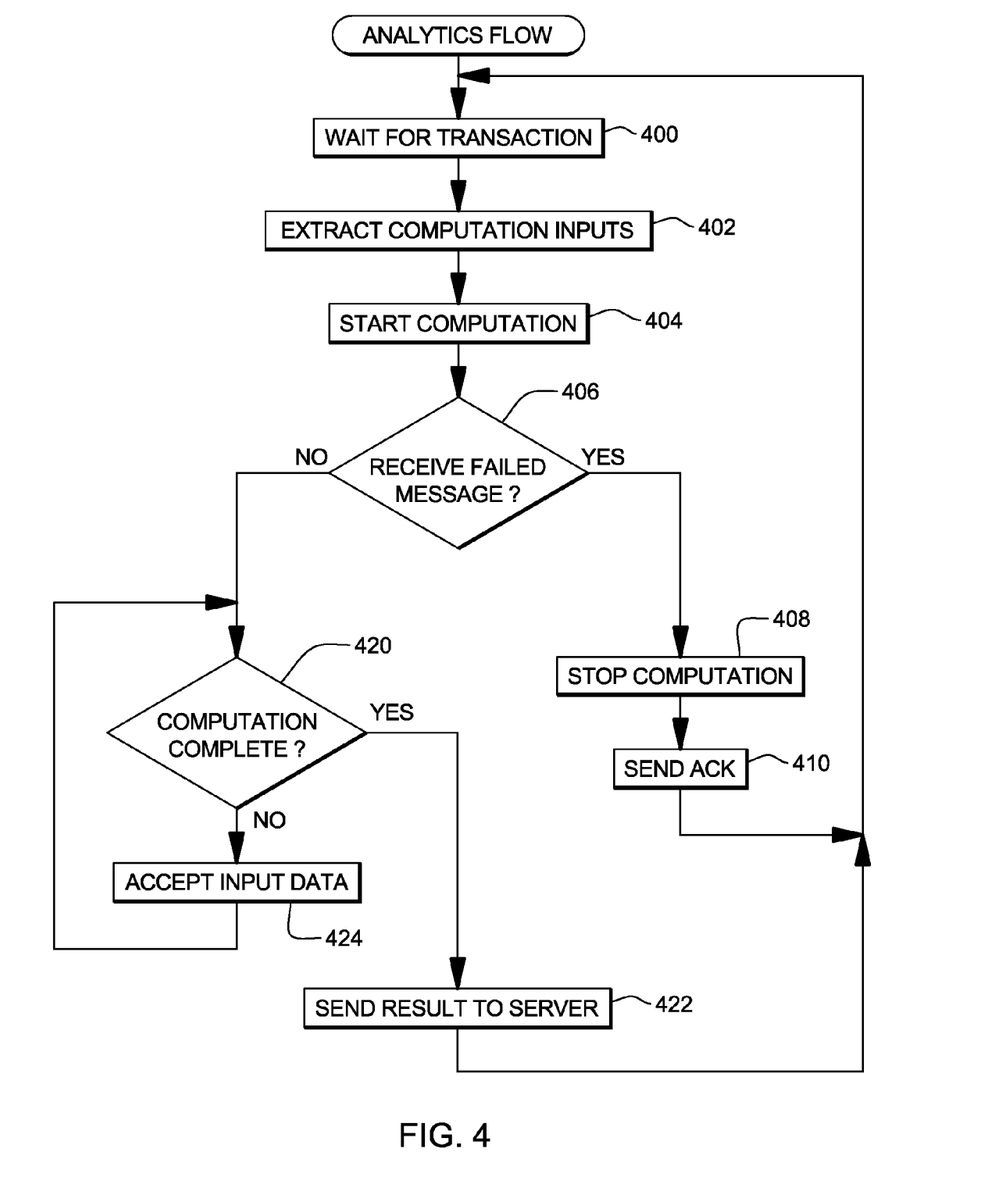
FIG. 4 depicts one embodiment of the logic to perform analytics processing for the request, in accordance with an aspect of the present invention.

A determination is made as to whether a message has been received from the server indicating that authorization has failed, INQUIRY 406. If so, then the analytics processing is ended prematurely and any intermediate results and state are discarded, STEP 408. Acknowledgement is sent back to the server indicating that it ended processing, STEP 410. Processing then continues at STEP 400, in which the analytics cluster waits for another transaction.

Returning to INQUIRY 406, if a failed message has not been received, then a determination is made as to whether the analytics processing is complete, INQUIRY 420. If so, then the results are sent back to the server, STEP 422, and processing continues with STEP 400, in which the analytics clusters waits for another transaction.

If, however, the analytics processing is not complete, INQUIRY 420, then the analytics cluster accepts from the server input data messages for the processing, if any, INQUIRY 424. Processing continues with INQUIRY 420, until the analytics processing is complete. This concludes the analytics processing.

Described in detail above is a request processing capability, in which a speculative protocol is used, where raw requests are mirrored directly to analytics processors without the request actually known to be authorized or successful. This allows analytic processing at the analytics cluster to be performed concurrently with request processing at the server. If the incoming request is valid/authorized, concurrent request processing and analytic processing ensures that validation/authorization and analytics are highly likely to complete at or around the same time. If not, the analytics has a head start increasing the opportunity for enhanced performance. Without such provisions, analytics can only start after request processing, leading to reduced performance. If the incoming request is unsuccessful, the server can cancel the analytics processing already in progress on the analytics processor to minimize any resource waste.

In accordance with one or more aspects of the present invention, request processing and analytics related to the request processing are parallelized using a speculative protocol. The analytics, which can be long or short running, begin on an unauthorized or non-executed request. The request processing and analytics processing can run substantially concurrently on a hybrid system. (In another example, they can run on the same system.) In certain cases, results of request authorization/validation might require return to the requestor without any results needed from the analytics computation. The server in this case will simply save the results of the analytics computation for future analysis.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system". Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable signal medium may include a propagated data signal with computer readable program code embodied therein, for example, in baseband or as part of a carrier wave. Such a propagated signal may take any of a variety of forms, including, but not limited to, electro-magnetic, optical or any suitable combination thereof. A computer readable signal medium may be any computer readable medium that is not a computer readable storage medium and that can communicate, propagate, or transport a program for use by or in connection with an instruction execution system, apparatus or device.

A computer readable storage medium may be, for example, but not limited to, an electronic, magnetic, optical, electro-magnetic, infrared or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Figure 5:
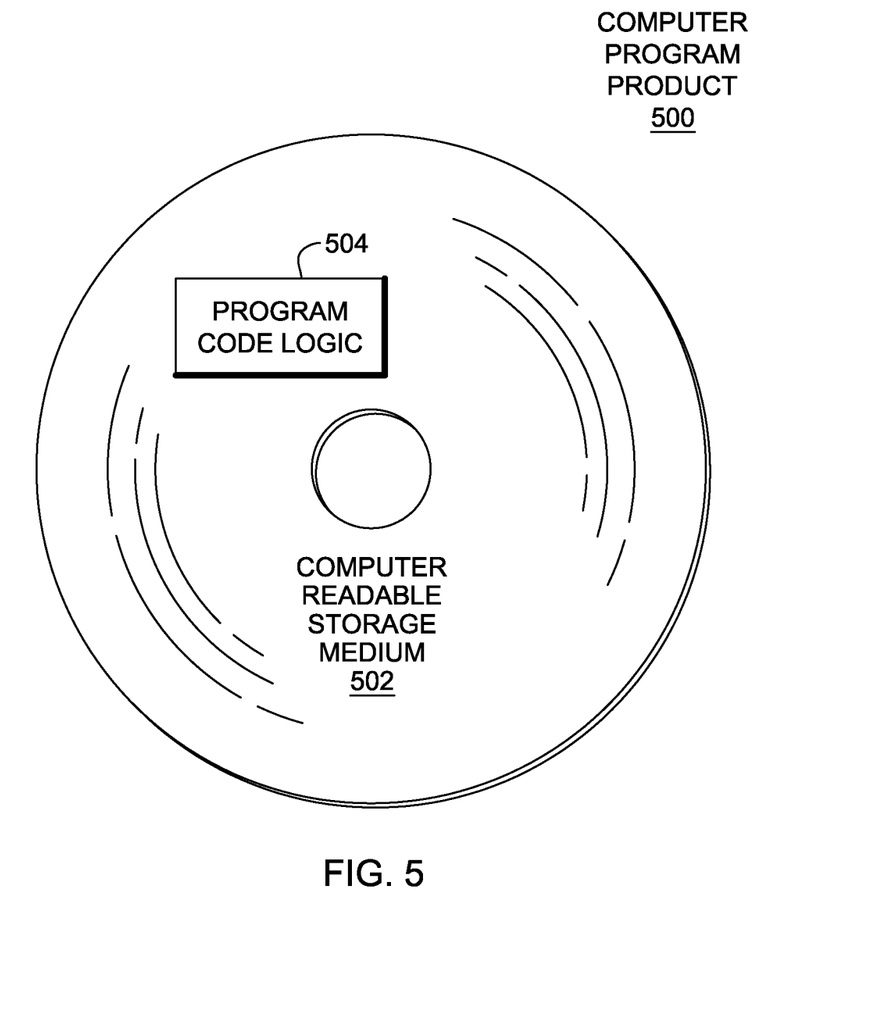
FIG. 5 depicts one embodiment of a computer program product incorporating one or more aspects of the present invention.

Referring now to FIG. 5, in one example, a computer program product 500 includes, for instance, one or more computer readable storage media 502 to store computer readable program code means or logic 504 thereon to provide and facilitate one or more aspects of the present invention.

Program code embodied on a computer readable medium may be transmitted using an appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language, such as Java, Smalltalk, C++ or the like, and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In addition to the above, one or more aspects of the present invention may be provided, offered, deployed, managed, serviced, etc. by a service provider who offers management of customer environments. For instance, the service provider can create, maintain, support, etc. computer code and/or a computer infrastructure that performs one or more aspects of the present invention for one or more customers. In return, the service provider may receive payment from the customer under a subscription and/or fee agreement, as examples. Additionally or alternatively, the service provider may receive payment from the sale of advertising content to one or more third parties.

In one aspect of the present invention, an application may be deployed for performing one or more aspects of the present invention. As one example, the deploying of an application comprises providing computer infrastructure operable to perform one or more aspects of the present invention.

As a further aspect of the present invention, a computing infrastructure may be deployed comprising integrating computer readable code into a computing system, in which the code in combination with the computing system is capable of performing one or more aspects of the present invention.

As yet a further aspect of the present invention, a process for integrating computing infrastructure comprising integrating computer readable code into a computer system may be provided. The computer system comprises a computer readable medium, in which the computer medium comprises one or more aspects of the present invention. The code in combination with the computer system is capable of performing one or more aspects of the present invention.

Although various embodiments are described above, these are only examples. For example, computing environments of other architectures can incorporate and use one or more aspects of the present invention, and/or different types of servers, computing units and/or switches may be used. Additionally, the mirroring may be performed differently, and/or different analytics may be performed. Further, the figure of merit may be computed differently, and/or the threshold may be optional. Many changes may be made without departing from the spirit of the present invention.

Further, other types of computing environments can benefit from one or more aspects of the present invention. As an example, an environment may include an emulator (e.g., software or other emulation mechanisms), in which a particular architecture (including, for instance, instruction execution, architected functions, such as address translation, and architected registers) or a subset thereof is emulated (e.g., on a native computer system having a processor and memory). In such an environment, one or more emulation functions of the emulator can implement one or more aspects of the present invention, even though a computer executing the emulator may have a different architecture than the capabilities being emulated. As one example, in emulation mode, the specific instruction or operation being emulated is decoded, and an appropriate emulation function is built to implement the individual instruction or operation.

In an emulation environment, a host computer includes, for instance, a memory to store instructions and data; an instruction fetch unit to fetch instructions from memory and to optionally, provide local buffering for the fetched instruction; an instruction decode unit to receive the fetched instructions and to determine the type of instructions that have been fetched; and an instruction execution unit to execute the instructions. Execution may include loading data into a register from memory; storing data back to memory from a register; or performing some type of arithmetic or logical operation, as determined by the decode unit. In one example, each unit is implemented in software. For instance, the operations being performed by the units are implemented as one or more subroutines within emulator software.

Further, a data processing system suitable for storing and/or executing program code is usable that includes at least one processor coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiment with various modifications as are suited to the particular use contemplated.

What is claimed is:

1. A computer program product for facilitating processing of requests within a computing environment, the computer program product comprising:
a non-transitory storage medium readable by a processing circuit and storing instructions for execution by the processing circuit for performing a method comprising:
obtaining, by at least one computing unit of the computing environment, data of a request to be executed;
at least initiating, by the at least one computing unit, analytics processing on the data of the request prior to an indication of success or failure of request processing for the request, wherein at least a portion of the request processing is performed concurrently to at least a portion of analytics processing, and wherein request processing includes one or more of authorization or validation of the request, and analytics processing comprises performing one or more of computations or analysis of the data of the request;
determining whether request processing for the request has failed during analytics processing for the request; and
based on determining request processing has failed during analytics processing for the request, prematurely cancelling analytics processing that is in process for the request, the analytics processing being speculatively performed prior to the indication of success or failure of the request processing for the request.

2. The computer program product of claim 1, wherein the method further comprises performing the request processing on a processor coupled to the at least one computing unit, wherein the processor is different from the at least one computing unit.

3. The computer program product of claim 1, wherein the obtaining comprises receiving the data of the request from a switch coupled to the at least one computing unit.

4. The computer program product of claim 3, wherein the method further comprises:
obtaining by the switch the request to be executed;
forwarding a copy of the data of the request to the at least one computing unit, wherein the at least one computing unit is to perform analytics processing on the data; and
forwarding the request to a processor coupled to the switch and the at least one computing unit, the processor to perform the request processing for the request.

5. The computer program product of claim 1, wherein based on determining that request processing for the request has not failed during analytics processing and based on analytics processing completing, providing a result of the analytics processing, the result to be used in providing one of a failed message or a success message to a requestor of the request depending at least in part on whether request processing completes successfully.

6. The computer program product of claim 5, wherein the method further comprises failing to use results of the analytics processing, based on determining that the request processing has failed.

7. The computer program product of claim 6, wherein the results are unused even based on successful completion of the analytics processing.

8. The computer program product of claim 1, wherein the method further comprises:
- performing request processing for the request;
- obtaining a result of analytics processing for the request;
- determining whether the result is valid; and
- providing a message indicating success to a requestor of the request, based on the result being valid and the request processing being successful.

9. The computer program product of claim 8, wherein the method further comprises providing a failed message to the requestor, based on an invalid result or a failure of request processing.

10. The computer program product of claim 8, wherein the performing, obtaining the result, determining whether the result is valid and providing are performed by a processor coupled to the at least one computing unit, and wherein the at least one computing unit is part of an analytics cluster, the analytics cluster and processor being coupled to a switch that received the request from the requestor and provided at least a first portion of the request to the processor and at least a second portion of the request to the at least one computing unit.

11. A computer system for facilitating processing of requests within a computing environment, said computer system comprising:
- a memory; and
- a processor in communications with the memory, wherein the computer system is capable of performing a method, said method comprising:
  - obtaining, by at least one computing unit, data of a request to be executed;
  - at least initiating, by the at least one computing unit, analytics processing on the data of the request prior to an indication of success or failure of request processing for the request, wherein at least a portion of the request processing is performed concurrently to at least a portion of analytics processing, and wherein request processing includes one or more of authorization or validation of the request, and analytics processing comprises performing one or more of computations or analysis of the data of the request;
  - determining whether request processing for the request has failed during analytics processing for the request; and
  - based on determining request processing has failed during analytics processing for the request, prematurely cancelling analytics processing that is in process for the request, the analytics processing being speculatively performed prior to the indication of success or failure of the request processing for the request.

12. The computer system of claim 11, wherein the method further comprises performing the request processing on a processor coupled to the at least one computing unit, wherein the processor is different from the at least one computing unit.

13. The computer system of claim 11, wherein the obtaining comprises receiving the data of the request from a switch coupled to the at least one computing unit, and wherein the method further comprises:
- obtaining by the switch the request to be executed;
- forwarding a copy of the data of the request to the at least one computing unit, wherein the at least one computing unit is to perform analytics processing on the data; and
- forwarding the request to a processor coupled to the switch and the at least one computing unit, the processor to perform the request processing for the request.

14. The computer system of claim 11, wherein based on determining that request processing for the request has not failed during analytics processing and based on analytics processing completing, providing a result of the analytics processing, the result to be used in providing one of a failed message or a success message to a requestor of the request depending at least in part on whether request processing completes successfully.

15. The computer system of claim 14, wherein the method further comprises failing to use results of the analytics processing, based on determining that request processing has failed, wherein the results are unused even based on successful completion of the analytics processing.

16. The computer system of claim 11, wherein the method further comprises:
- performing request processing for the request;
- obtaining a result of analytics processing for the request;
- determining whether the result is valid; and
- providing a message indicating success to a requestor of the request, based on the result being valid and the request processing being successful.

17. The computer system of claim 16, wherein the performing, obtaining the result, determining whether the result is valid and providing are performed by a processor coupled to the at least one computing unit, and wherein the at least one computing unit is part of an analytics cluster, the analytics cluster and processor being coupled to a switch that received the request from the requestor and provided at least a first portion of the request to the processor and at least a second portion of the request to the at least one computing unit.

18. A method of facilitating processing of requests within a computing environment, said method comprising:
- obtaining, by at least one computing unit of the computing environment, data of a request to be executed;
- at least initiating, by the at least one computing unit, analytics processing on the data of the request prior to an indication of success or failure of request processing for the request, wherein at least a portion of the request processing is performed concurrently to at least a portion of analytics processing, and wherein request processing includes one or more of authorization or validation of the request, and analytics processing comprises performing one or more of computations or analysis of the data of the request;
- determining whether request processing for the request has failed during analytics processing for the request; and
- based on determining request processing has failed during analytics processing for the request, prematurely cancelling analytics processing that is in process for the request, the analytics processing being speculatively performed prior to the indication of success or failure of the request processing for the request.

19. The method of claim 18, further comprising:
- obtaining by the switch the request to be executed;

forwarding a copy of the data of the request to the at least one computing unit, wherein the at least one computing unit is to perform analytics processing on the data; and forwarding the request to a processor coupled to the switch and the at least one computing unit, the processor to performing the request processing for the request.

20. The method of claim 18, wherein based on determining that request processing for the request has not failed during analytics processing and based on analytics processing completing, providing a result of the analytics processing, the result to be used in providing one of a failed message or a success message to a requestor of the request depending at least in part on whether request processing completes successfully.

* * * * *